United States Patent [19]

Hayes

[11] 3,892,656

[45] July 1, 1975

[54] CONTINUOUS LOW PRESSURE CATALYTIC REFORMING PROCESS

[75] Inventor: John C. Hayes, Palatine, Ill.

[73] Assignee: Universal Oil Products Company, Des Plaines, Ill.

[22] Filed: Mar. 29, 1974

[21] Appl. No.: 456,704

Related U.S. Application Data

[63] Continuation-in-part of Ser. No. 277,708, Aug. 3, 1972, Pat. No. 3,806,447.

[52] U.S. Cl................................. 208/139; 208/138
[51] Int. Cl............................................ C10g 35/08
[58] Field of Search........................... 208/138, 139

[56] References Cited
UNITED STATES PATENTS

| | | | |
|---|---|---|---|
| 2,193,772 | 3/1940 | Savage | 208/68 |
| 2,943,999 | 7/1960 | Moore et al. | 208/139 |
| 3,054,744 | 9/1962 | Elliott | 208/64 |
| 3,091,584 | 5/1963 | Singer | 208/65 |
| 3,264,207 | 8/1966 | Pfefferle | 208/138 |
| 3,806,447 | 4/1974 | Hayes | 208/139 |

*Primary Examiner*—Delbert E. Gantz
*Assistant Examiner*—James W. Hellwege

*Attorney, Agent, or Firm*—James R. Hoatson, Jr.; Thomas K. McBride; William H. Page, II

[57] ABSTRACT

An improved method of operation is provided for a catalytic, low pressure process for continuously reforming a hydrocarbon charge stock boiling in the gasoline range in order to produce a high octane effluent stream in which process the hydrocarbon charge stock and hydrogen are continuously contacted in a reforming zone with a reforming catalyst containing a catalytically effective amount of a platinum group metal at reforming conditions including a pressure of 25 to 250 psig. The improved method of operation involves continuously adding a refractory light hydrocarbon to the reforming zone in an amount sufficient to result in a mole ratio of refractory light hydrocarbon to hydrogen entering the reforming zone of about 0.4:1 to about 10:1. Moreover, the refractory light hydrocarbon addition is commenced at start-up of the process and continued throughout the duration of the reforming run. The principal advantage associated with this improved method of operation is increased stability of the reforming catalyst and particularly, increased temperature stability at octane.

13 Claims, No Drawings

CONTINUOUS LOW PRESSURE CATALYTIC REFORMING PROCESS

CROSS-REFERENCES TO RELATED APPLICATIONS

This application is a continuation-in-part of my prior, copending application Ser. No. 277,708 which was filed on Aug. 3, 1972, now U.S. Pat. No. 3,806,447, Apr. 23, 1974. All of the teaching of this prior application is specifically incorporated herein by reference.

The subject of the present invention is an improved method of operation of a low pressure catalytic reforming process which is designed to operate on a relatively low octane hydrocarbon fraction boiling within the gasoline range in order to produce high yields of a high octane reformate. The improved method of operation encompassed by the present invention essentially involves the continuous addition of a refractory light hydrocarbon to the catalytic reforming process in order to suppress catalyst deactivation reactions and increase the stability characteristics of a platinum-containing catalyst used in the process. More precisely, the present invention relates to the use of refractory light hydrocarbon addition in a low pressure, continuous reforming process which uses a platinum group metal-containing catalyst. This hydrocarbon addition is, in accordance with the present invention, in an amount sufficient to result in a mole ratio of refractory light hydrocarbon to hydrogen entering the reforming zone of about 0.4:1 to about 10:1 and the hydrocarbon addition is commenced at start-up of the process and continued throughout the duration of the reforming run. In one aspect, the improvement of the present invention involves the continuous addition of a refractory light hydrocarbon to the reforming process in an amount which is selected from the range previously stated and which is thereafter maintained constant throughout the run. In another aspect, the improvement of the present invention involves the addition of a refractory light hydrocarbon to the reforming process at start-up in an amount selected from the upper region of the range previously stated coupled with negative adjustment of the added amount of hydrocarbon entering the reforming zone as the run progresses responsive to deactivation of the catalyst until a value in the lower region of the range previously given is reached. That is, this last aspect of the invention involves using a refractory light hydrocarbon additive continuously, but decreasing the amount added to the reforming zone as the run progresses responsive to catalyst deactivation until a final value is achieved which is still within the range of about 0.4:1 to about 10:1 added hydrocarbon to hydrogen entering the reforming zone.

It is well known in the art that the requirements for an optimum process for transforming low octane stocks into high octane stocks, at minimum loss to undesirable products, involves a specially tailored catalytic environment that is designed to promote upgrading reactions for paraffins and napthenes, which are the components of gasolines and naphthas that have the highest octane-improving potential. For paraffins the upgrading reactions are: isomerization to more highly branched paraffins, dehydrogenation to olefins, dehydrocyclization to aromatics, and hydrocracking to lower molecular weight paraffins. Of these, the dehydrocyclization reaction is the one that shows the maximum gain in octane number and is, consequently, preferred. For naphthenes, the principal upgrading reactions involve dehydrogenation to aromatics and ring isomerization and dehydrogenation to aromatics; but, the change in octane number is not as dramatic here as in the case of dehydrocyclization of paraffins since the clear research octane number of most naphthenes is in the range of 65 to 80. Accordingly, catalytic reforming operations are designed to provide an optimum mix between the aforementioned reactions, generally employing for this purpose a multi-purpose catalytic composite having at least a metallic dehydrogenation component and an acid-acting component.

It is not, however, to be assumed that the achievement and control of this optimum mix of upgrading reactions is without its problem areas. These, as is true with any complex set of reaction mechanisms, are injected into the picture by the uncontrollable side phenomena that are produced by a myriad of factors that color and complicate the actual operations of such a reforming process. Foremost among these complicating factors are those associated with undesired side reactions. Examples of these side reactions are: demethylation of hydrocarbons to produce methane, ring opening of naphthenes to give straight chain hydrocarbons, excessive hydrocracking of paraffins to yield light gases (i.e., $C_1$ to $C_4$), condensation of aromatics and other components to form carbonaceous deposits on the catalyst, acid-catalyzed polymerization of olefins and other highly reactive components to yield high molecular weight reactants that can undergo further dehydrogenation and thus contribute to the carbonaceous deposits on the catalyst, etc.

A successful reforming operation, therefore, minimizes the effects of these complicating factors by judicious selection of the catalytic environment and process variables for the particular charge stock of interest. But, adding an additional dimension of complexity to the solution of this problem is the interdependence of the set of desired reactions and the set of undesired reactions such that selection of the proper conditions to minimize undesired reactions has a marked effect on the set of desired reactions.

Nowhere is this interdependence more evident than in a "continuous reforming process". By continuous reforming process, it is meant a reforming process that is operated for a catalyst life of at least 15 barrels of charge per pound of catalyst (abbreviated herein as BPP) without regeneration. As is well recognized in the art, continuous reforming processes are sharply distinguishable from "regenerative" reforming processes because in the latter type of process at least a portion of the catalyst is continuously being regenerated and the catalyst life before regeneration is always substantially less than 1 BPP. Typically, in a regenerative reforming system operated to yield a $C_5+$ reformate near 100 F-1 clear, all of the catalyst in the system is regenerated during every 5 days of operation. In regenerative reforming, stability is not a problem because of the continuous regeneration capability and the dominating objective in this type of reforming process is selectivity at octane. Because regenerative reforming systems are not directly concerned with minimizing the side reactions that lead to catalyst instability, it is to be understood that the concept of the present invention has no relationship to regenerative reforming. Similarly, the art on regenerative reforming since it is directed at the solution of a different problem has little relevance to continuous reforming systems where the dominating problem is the stability problem. Indeed, it is but a truism to observe that if a regenerative reforming process could be operated in a stable fashion it would cease to require continuous regeneration capability. Hence, the concept of the present invention relates exclusively to continuous reforming systems becauses in this system it is necessary to suppress undesired side reactions that lead to catalyst deactivation in order to maintain catalyst activity at a high level for a catalyst life of at least 15 BPP.

Because regenerative reforming systems need not be concerned about stability, the universal practice has been to run them at low pressure because of well known short term yield advantages. The term "low pressure" as used herein means about 50 to about 350 psig. For some time now, there has been a substantial need for a continuous reforming process that can operate at low pressure without sacrificing either stability or selectivity.

At this point, it is to be carefully noted that a low pressure, continuous reforming process is desired because the two main upgrading reactions mentioned previously — dehydrocyclization of paraffins and dehydrogenation of naphthenes — are net producers of hydrogen and as such they are favored by low system pressure.

The principal barrier to low pressure operation in the past has been the effect of low pressure on the previously mentioned catalyst-fouling reactions of condensation and polymerization which are believed to be the principal reactions involved in carbon or coke formation on the catalyst. It is thought that this carbon formation involves in part certain olefinic and aromatic hydrocarbons which appear to be adsorbed on the surface of the reforming catalyst, particularly at the dehydrogenation and aromatization sites, and that these catalytically active sites are thereby shielded from the materials being processed. Moreover, aromatics and olefinic materials in the presence of a reforming catalyst tend to undergo dehydrogenation, condensation, and polymerization type reactions and to settle on the catalyst and undergo further dehydrogenation and decomposition until carbonaceous deposits are formed. Low pressures tend to favor these catalyst-fouling reactions because insufficient hydrogen is available to suppress these catalyst-fouling reactions which are generally characterized as hydrogen-producers. In addition, a low partial pressure of hydrogen, since it suppresses hydrocracking and hydrogenation tends to allow carbonaceous deposit precursors to collect on the catalyst, whereas ordinarily the high cracking activity and hydrogenation activity of the catalyst would tend to keep the catalyst relatively free of these carbonaceous deposit precursors. In any event, this increase in catalyst-fouling at low pressures results in the decline in catalyst aromatization activity and, if a product of constant quality is desired, it is necessary to compensate for this deactivation. Usually, the most direct and inexpensive method for conpensating, in a continuous reforming system, involves increasing the reaction temperature. This, in turn, however, leads to the promotion of hydrocracking to a greater extent then dehydrogenation and dehydrocyclization reactions. Hence, greater losses to light gases are encountered and hydrogen consumption goes up and $C_5+$ yield goes down. Furthermore, the rate of catalyst fouling increases dramatically as temperature is increased. Accordingly, prior attempts at operating a continuous reforming process at low pressure have encountered a severe stability problem.

The problem addressed by the present invention then is to find a method for increasing the stability characteristics of a reforming catalyst containing a platinum group metal when it is used in the continuous reforming process at a low pressure of about 25 to about 250 psig.

The conception of the present invention was a product of a number of recent attempts associated with the art of continuous low pressure catalytic reforming systems. The first development involved my finding that one of the primary causes for catalyst deactivation in a low pressure catalytic reforming process is associated with what I call "sluggish" desorption of the hydrocarbon reaction products from the active sites of the catalyst; these are primarily the platinum group metal sites on the catalyst. Coupled with this observations was my discovery that this sluggish desorption phenomenon can be controlled by the addition to the reaction environment of other adsorbable substances that can compete with the hydrocarbon reactants and products for the available sites on the catalyst. Without intending to be limited by this explanation, I attribute the improved stability observed when substances that are competetively adsorbed on the platinum group metal sites are added to a reforming process to the fact that heavier hydrocarbon products, that are the precursors to undesired carbonaceous deposits, have a diminished affinity for the platinum group metal sites of the catalyst and their desorption can be accelerated by providing a competitively adsorbable substance to the reaction environment in order to displace these heavier hydrocarbon products before they have a chance to undergo further dehydrogenation to form refractory carbonaceous deposits which if unchecked can rapidly deactivate the catalyst. In other words, I have ascertained that the stability of a platinum group metal-containing reforming catalyst can be sharply improved if a method is provided to accelerate the desorption of hydrocarbon reactants from the platinum group metal sites of the catalyst before they have a chance to undergo further dehydrogenation to form refractory, hydrocarbonaceous deposits with consequential deactivation of the catalyst; and, furthermore, that this desorption can be accelerated by providing in the reaction environment a readily adsorbable substance which can compete for the platinum group metal sites of the catalyst and thereby act to remove or sweep off the hydrocarbon products. Based upn this analysis of the catalyst deactivation problem in a low pressure catalytic reforming process, I have now found that a refractory light hydrocarbon, specifically methane, ethane and propane, can function as competitively adsorbable substances in a reforming reaction environment with consequential increase in the stability characteristics of the catalyst. This finding that refractory light hydrocarbon can be utilized to stabilize a platinum group metal-containing reforming catalyst in a low pressure operation stands in sharp contract to the traditional teachings in this art that the presence of light hydrocarbon in a catalytic reforming environment is undesired. Quite to the contrary, I have ascertained that the presence of a refractory light hydrocarbon, such as methane, ethane or propane, in the reforming zone in an amount corresponding to a mole ratio of refractory light hydrocarbon to hydrogen of about 0.4:1 to about 10:1 can act to sharply increase the stability characteristics of the catalyst with consequent prolongation of catalyst life. In essence then the invention involves the continuous addition of a refractory light hydrocarbon in a relatively large amount to a continuous, low pressure catalytic reforming process in order to provide the competitively adsorbable substance necessary to displace heavier hydrocarbon products from the catalyst before they have a chance to undergo further modifications to produce refractory carbonaceous deposits. AN attendant finding is that this refractory light hydrocarbon addition can be accomplished in two distinct ways. In one mode of operation of my improved reforming process, the refractory light hydrocarbon is added to the reforming environment at start-up of the process in an amount selected from the range of 0.4:1 to about 10:1 moles of refractory light hydrocarbon per mole of hydrogen and thereafter, the amount of hydrocarbon added is maintained constant at this initial amount for the duration of the reforming run. In another mode of operation of my improved process, a relatively large amount of refractory light hydrocarbon is initially added to the reforming zone during the start-up of the process and the amount of hydrocarbon continuously added is thereafter gradually decreased during the subsequent reforming operation in order to compensate for the inevitable deactivation that occurs in even a highly stable reforming operation.

It is, accordingly, an object of the present invention to provide a solution to the problem of accelerated catalyst deactivation in a catalytic reforming process operated with a platinum group metal-containing catalyst in a low pressure operation. Another object is to provide a method for increasing the stability, particularly the temperature stability, of a catalytic reforming process operated at a relatively low pressure. Still another object is to provide a method for retarding the formation of refractory, deactivating carbonaceous deposits on a platinum group metal-containing reforming catalyst when it is operated in a low pressure, high severity type of operation, thereby increasing the catalyst life before regeneration becomes necessary.

Against this background, the present invention is in one embodiment an improved method for operating a catalytic, low pressure process for continuously reforming a hydocarbon charge stock boiling in the gasoline range wherein the hydrocasbon charge stock and hydrogen are continuously contacted with a reforming catalyst, containing a catalytically effective amount of a platinum group metal, at reforming conditions, including a pressure of about 25 to about 250 psig., selected to produce a high octane effluent stream. The improved method of operation comprises continuously adding a refractory light hydrocarbon to the reforming zone in an amount sufficient to result in a mole ratio of refractory light hydrocarbon to hydrogen entering the reforming zone of about 0.4:1 to about 10:1. Furthermore, this hydrocarbon addition is commenced at start-up of the process and is continued without interruption throughout the duration of the reforming run.

In another embodiment, the present invention is an improved method for operating a catalytic reforming process as described above in the first embodiment wherein the amount of refractory light hydrocarbon added to the reforming zone is maintained constant throughout the duration of the reforming run.

A third embodiment of the present invention involves an improved method of operating a reforming process as outlined above in the first embodiment wherein the amount of refractory light hydrocarbon added to the reforming zone during start-up is selected from the range hereinbefore stated and thereafter is decreased in increments of about 1 to 10% of the initial value in response to deactivation of the catalyst to a final value of about 10 to about 50% of the value initially selected and thereafter the amount of refractory light hydrocarbon added is maintained constant at this last value.

In yet another embodiment, the present invention is an improved method for operating a catalytic reforming process as depicted above in the first embodiment wherein the reforming catalyst utilized comprises a porous carrier material containing catalytically effective amounts of a platinum group metal and combined halogen.

Still another embodiment comprises an improvement in the catalytic reforming process as delineated above in the first embodiment wherein the reforming catalyst comprises a porous carrier material containing catalytically effective amounts of a platinum group metal, combined halogen and a metal selected from the group consisting of rhenium, iridium, tin, germanium and lead.

Specific objects and embodiments of the present invention relate to details concerning process conditions used therein, particularly preferred catalysts and refractory light hydrocarbons for use therein, types of charge stocks that can be reformed thereby, and mechanics of the reforming step and product recovery steps associated therewith, etc. These specific objects and embodiments will become evident from the following detailed explanation of the essential elements of the present invention.

Before considering in detail the various ramifications of the present invention, it is convenient to define several of the terms, phrases, and conventions used in the specification and the claims. The expression "refractory light hydrocarbon" means a normally gaseous hydrocarbon that is not reacted, altered or consumed to any substantial degree when it is contacted with the hereinafter specified reforming catalyst at reforming conditions. The phrase "gasoline boiling range" as used herein refers to a temperature range having an upper limit of about 400° to about 425° F. The term "naphtha" refers to a selected fraction of a gasoline boiling range distillate and will generally have an initial boiling point of from about 150° to about 250° F. and an end boiling point within the range of about 350° to about 425° F. The phrase "hydrocarbon charge stock" is intended to refer to a portion of a petroleum crude oil, a mixture of hydrocarbons, a coal tar distillate, a shale oil, a Fisher-Tropsch naphtha, etc., that boils within a given temperature range. The expression "refractory light hydrocarbon entering the reforming zone" means the total quantity of refractory light hydrocarbon entering the reforming zone from any source. The phrase "substantially water-free" refers to the situation where the total water and water-producing compounds entering the reforming zone from any source is at least less than 20 ppm. by weight of equivalent water based on the hydrocarbon charge stock. The term "selectivity" when it is applied to a reforming process refers to the ability of the process to make hydrogen and $C_5+$ yield and to inhibit $C_1-C_4$ yield. The term "activity" when it is applied to reforming processes refers to the ability of the process, at a specified severity level, to produce a $C_5+$ product of the required quality as measured by octane number. The term "stability" when it is applied to the reforming process means the rate of change with time of the operation parameters associated with the process; for instance, a common measure of stability is the rate of change of reactor temperature that is required to maintain a constant octane number in output $C_5+$ product — the smaller slope implying the more stable process. The "liquid hourly space velocity" (LHSV) is defined to be the equivalent liquid volume of the charge stock flowing through the bed of catalyst per hour divided by the volume of the catalyst bed. A time period of one BPP is the amount of time, at a fixed charge rate, necessary to process 1 barrel of charge per pound of catalyst contained in the conversion zone.

The hydrocarbon charge stock that is reformed in accordance with the improved process of the present invention is generally a hydrocarbon fraction containing naphthenes and paraffins. The preferred charge stocks are those consisting essentially of naphthenes and paraffins although in some cases aromatics may also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasoline can also be used. The gasoline charge stock may be a full boiling range gasoline having an initial boiling point of from about 50° to about 100° F. and an end boiling point within the range of from about 325° to 425° F., or may be a selected fraction thereof which usually will be a higher boiling fraction commonly referred to as a heavy naphtha. It is also within the scope of the present invention to charge pure hydrocarbons or mixtures of hydrocarbons, usually paraffins or naphthenes, which it is desired to convert to aromatics.

The charge stock must be carefully controlled in the areas of concentration of sulfur-containing compounds, nitrogen-containing compounds and oxygen-containing compounds. In general, it is preferred that the concentration of all of these constituents be reduced to very low levels (i.e., at least less than 5 wt. ppm. and preferably less than 1 wt. ppm.) by any suitable pretreating method such as a mild hydrogenation treatment with a suitable supported catalyst such as a cobalt- and/or molybdenum-containing catalyst in a conventional hydrorefining or hydrotreating process.

An essential feature of the improvement of the present invention involves the continuous addition of a refractory light hydrocarbon to the catalytic reforming zone as a function of the amount of hydrogen added thereto. Although I have discerned that all light hydrocarbons have some degree of the desired competitive adsorption characteristics necessary for the acquisition of the improved stability characteristics associated with the present invention, I much prefer to use a $C_1$ to $C_3$ alkane for this purpose because of their wide availability, relatively low cost and relative inertness for undesired side reactions, as contrasted with the other light hydrocarbons. That is, it is within the scope of the present invention to use methane, ethane, propane or mixtures thereof as the competitive adsorption additive. However, I find best results are obtained when the hydrocarbon additive is methane. The refractory light hydrocarbon used in the practice of the present invention will ordinarily be obtained from a natural gas stream. Other sources of refractory light hydrocarbons may be used for this purpose such as a synthetic natural gas stream produced by the steam-reforming of a hydrocarbon charge stock followed by a methanization reaction wherein carbon monoxide is reacted over a suitable catalyst with hydrogen to produce methane and water. The only substantial restriction on the refractory light hydrocarbon additive for use in my improved process is that it should be substantially free from materials such as carbon monoxide, carbon dioxide, arsenic, hydrogen sulfide, ammonia, water and the like which might be harmful to a platinum group metal-containing catalyst if present in uncontrolled amounts.

The amount of refractory light hydrocarbon that must be added to the process in order to achieve the improvement of the present invention corresponds to about 0.4:1 to about 10:1 moles of refractory light hydrocarbon per mole of hydrogen charged to the reforming zone. Best results are ordinarily obtained when the mole ratio of refractory light hydrocarbon to hydrogen entering the reforming zone is maintained in the range of about 0.5:1 to about 3.5:1. This refractory light hydrocarbon stream can be added to the reforming zone independently of the hydrocarbon charge stock stream and the hydrogen stream if desired; however, it is usually most convenient to admix the refractory light hydrocarbon stream with the hydrogen stream and the charge stock and to heat the resulting mixture in a suitable heating means to the required reforming temperature prior to passage of the mixture into the catalytic reforming zone. It is understood that significant portion of the refractory light hydrocarbon additive may be obtained from the effluent stream recovered from the reforming zone by means of appropriate separation and recycle operations. Likewise, a significant portion of the hydrocarbon additive used in the present process can be recovered from the high octane reformate product from the reforming zone by a suitable fractionation step performed on the hydrocarbon-rich effluent stream after hydrogen is separated therefrom. The mechanics and technology for recovering and recycling of refractory light hydrocarbons in this fashion are well known to those skilled in the art and will not be presented here.

In accordance with the present invention, this refractory light hydrocarbon addition must be established during start-up of the process and continued, without interruptions, for the duration of the reforming run in order to see the maximum benefits of the competitive adsorption phenomenon described hereinbefore. In one mode of operation the amount of refractory light hydrocarbon additive is established during start-up of the process at a value corresponding to a mole ratio ofo refractory light hydrocarbon to hydrogen entering the reforming zone of about 0.4:1 to about 10:1 and thereafter the amount of hydrocarbon addition is maintained constant throughout the duration of the reforming run at this value initially established during start-up of the process. In a second mode of operation, the amount of hydrocarbon additive charged to the reforming zone is established during start-up within the upper region of the range corresponding to about 0.4:1 to about 10:1 moles of refractory light hydrocarbon per mole of hydrogen and thereafter the amount of hydrocarbon additive entering the reforminf zone is decreased responsive to the observed deactivation of the reforming catalyst in increments of about 1 to about 10% of the initial value until a value of about 10 to about 50% of the initial value is obtained. Thereafter, this final value is maintained for the remaining portion of the reforming run. It is to be noted that another essential feature of my improvement is the continuous addition of a refractory light hydrocarbon to the reforming zone, intermittent addition having found to be completely unsatisfactory.

The reforming catalyst utilized in the present invention contains a platinum group metal. Typically, this component is combined with a suitable refractory inorganic oxide carrier material such as alumina, silica, zirconia, magnesia, boria, thoria, titania, strontia, etc., and mixtures of two or more including silica-alumina, alumina-boria, silica-alumina-zirconia, etc. It is understood that these refractory inorganic oxides may be manufactured by any suitable method including separate, successive, or coprecipitation methods of manufacture, or they may be naturally-occurring substances such as clays, or earths which may or may not be purified or activated with special treatment. The preferred carrier material comprises a porous, adsorptive, high surface area alumina support having a surface area of about 25 to 500 or more $m^2/g$. Suitable alumina materials are the crystalline aluminas known as gamma-, eta-, and theta-alumina, with gamma-alumina giving best results. In addition, in some embodiments the preferred alumina carrier material may contain minor proportions of other well known refractory inorganic oxides such as silica, zirconia, magnesia, etc. However, the preferred carrier material is substantially pure gamma-alumina. In fact, an especially perferred carrier material has an apparent bulk density of about 0.3 to about 0.7 g/cc and has surface area characteristics such that the average pore diameter is about 20 to about 300 Angstroms, the pore volume is about 0.1 to about 1.0 ml/g and the surface area is about 100 to about 500 $m^2/g$. A preferred method for manufacturing this alumina carrier material is given in U.S. Pat. No. 2,620,314.

A preferred constituent of the reforming catalyst is a halogen component. Although the precise form of the chemistry of the association of the halogen component with the carrier material is not entirely known, it is customary in the art to refer to the halogen component as being combined with the carrier material or with the other ingredients of the catalyst in the form of the halide (e.g. as the chloride). This combined halogen may be either fluorine, chlorine, iodine, bromine, or mixtures thereof. Of these, fluorine and, especially, chlorine are preferred for the purposes of the present invention. The halogen may be added to the carrier material in any suitable manner, either before, during, or after the addition of the other components. For example, the halogen may be added as an aqueous solution of a suitable decomposable, halogen-containing compound such as hydrogen fluoride, hydrogen chloride, hydrogen bromide, ammonium chloride, carbon tetrachloride, the alkyl chlorides, etc. In addition, the halogen or a portion thereof may be combined with the carrier material during the impregnation of the latter with the platinum group metal component; for example, through the utilization of a mixture of chloroplatinic acid and hydrogen chloride. In another situation, the alumina hydrosol which is typically utilized to form the preferred alumina carrier material may contribute at least a portion of the halogen component to the final composite. In any event, the halogen will by typically composited in such a manner as to result in a final composite containing about 0.1 to about 1.5 wt. %. and preferably about 0.4 to about 1 wt. % of halogen calculated on an elemental basis.

The reforming catalyst must contain a platinum group metal. Although the preferred catalyst contains platinum or a compound of platinum, it is intended to include other platinum group metals such as palladium, rhodium, ruthenium, osmium, and iridium. The platinum group metallic component, such as platinum may exist within the final catalytic composite as a compound such as an oxide, sulfide, halide, etc., or as an elemental metal. Generally, the amount of the platinum group metallic component present in the final catalyst is small compared to the quantites of the other components combined therewith. In fact, the platinum group metallic component generally comprises about 0.01 to about 3 wt. % of the final catalyst, calculated on an elemental basis. Excellent results are obtained when the catalyst contains about 0.1 to about 2 wt. % of the platinum group metal.

The platinum group component may be incorporated in the catalytic composite in any suitable manner such as coprecipitation or cogellation with the preferred alumina support, ion-exchange with the alumina support and/or alumina hydrogel, or impregnation of the carrier material at any stage in its preparation either before, during or after its calcination treatment. The preferred method of preparing the catalyst involves the utilization of a soluble, decomposable compound of a platinum group metal to impregnate the carrier material. Thus, the platinum group metal may be added to the carrier material by commingling the latter with an aqueous solution of chloroplatinic acid or an equivalent compound.

The reforming catalyst utilized in the improved process of the present invention may, as indicated above be a monometallic, platinum group metal-containing catalyst or it may be one of the recently discovered bimetallic catalysts which have been shown to have significantly improved activity, selectivity and stability characteristics in a low pressure, catalytic reforming process. These later catalysts generally comprise a porous carrier material having combined therewith catalytically effective amounts of the platinum group metal component and an additional metal promotor selected from the group consisting of rhenium, iridium, tin, germanium and lead. This additional promoting ingredient may exist within the final catalytic composite as a component such as an oxide, sulfide, halide, oxyhalide, aluminate and the like or as an elemental metal. Generally, the amount of this additional metallic ingredient present in the final catalyst is relatively small compared to the amount of the platinum group metallic component as previously described. More specifically, this additional metallic component generally comprises 0.01 to about 5 wt. % of the final catalyst, calculated on an elemental basis. It is significant to note that my finding in regard to the stabilizing effect of a refractory light hydrocarbon additive on a platinum group metal-containing catalyst also applies to these bimetallic reforming catalyst which have been specifically designed for use in a low pressure, high severity catalytic reforming process. Thus, use of a hydrocarbon additive and one of these bimetallic catalysts is particularly beneficial because the stabilizing effect of each are cumulative with consequent dramatic increase in stability as compared to a straight low pressure catalytic reforming operation with a monometallic platinum-containing catalyst and without refractory light hydrocarbon addition.

Following the incorporation of the platinum group metal, combined halogen and additional metallic promoting ingredient, if such is used, into the porous carrier material, the resulting catalyst is typically dried and subjected to a conventional high temperature calcination or oxidation treatment at conditions selected to oxidize the metallic ingredients with resulting production of a catalyst containing the metallic ingredients in the form of the corresponding oxide. Thereafter, conventional additional treatments such as prereduction and/or presulfiding may be performed on the resulting oxidized composite if desired in order to prepare a catalyst suitable for use in the instant improved catalytic reforming process.

It is understood that the reforming catalyst for use in the present invention may be manufactured in any suitable manner and that the precise method of manufacture is not considered to be a limiting feature of the present invention. Likewise, it is understood that the catalyst may be present in any desired shape, such as: spheres, pills, pellets, extrudates, powders, etc. Additional details on preferred catalysts for the process of the present invention are given in U.S. Pat. Nos. 2,479,109 and 3,296,119.

According to the present invention, the hydrocarbon charge stock, hydrogen and a refractory light hydrocarbon are continuously contacted in a reforming zone with a reforming catalyst containing a platinum group metal at reforming conditions. This reforming step may be accomplished in a fixed bed system, a moving bed system, a fluidized system, or in a batch type operation; however, in view of the danger of attrition losses of the valuable catalyst and of well known operational advantages, it is preferred to use a fixed bed system. In this system, a hydrogen-rich stream, a refractory light hydrocarbons stream and the charge stock are either separately or collectively preheated, by any suitable heating means, to the desired reaction temperature and then are passed into a reforming zone containing a fixed bed of the reforming catalyst. It is, of course, understood that the reforming zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward, or radial flow fashion with the latter being preferred.

In a preferred mode of operation of the present invention, the reforming zone is maintained substantially water-free. To achieve and maintain this condition, it is necessary to control the water initially present in the reforming zone and the water level present in the charge stock, refractory light hydrocarbon stream and the hydrogen stream which are charged to the reforming zone. It is preferred that the equivalent water entering the reforming zone from all sources be held to a level less than that equal to 20 wt. ppm. of the charge stock. In general, this can be accomplished by predrying the reforming zone with a suitable circulating dry gas such as dry hydrogen and by continuously drying the charge stock with any suitable drying means known to the art such as a conventional solid adsorbent having a high selectivity for water, for instance, silica gel, activated alumina, calcium, or sodium crystalline aluminosilicates, anhydrous calcium sulfate, high surface area sodium, and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to continuously maintain the water content of the hydrogen stream and the refractory light hydrocarbon stream entering the hydrocarbon conversion zone down at a level of about 10 vol. ppm. of water or less, respectively. This can be conveniently accomplished when needed by contacting the hydrogen stream and the refractory light hydrocarbon stream with any suitable adsorbent such as the ones mentioned above. The preferred drying means for the charge stock, refractory light hydrocarbon stream and the hydrogen stream is calcium aluminosilicate molecular sieves having a pore size of about 5 Angstroms.

Regardless of the details of the operation of the reforming step, an effluent stream is continuously withdrawn from the reforming zone, cooled in a conventional cooling means and typically passed to a separating zone wherein a hydrogen-rich and refractory light hydrocarbon-rich gas phase separates from a heavy hydrocarbon-rich liquid phase. A gas stream is then withdrawn from the separating zone and a portion of it vented from the system in order to remove the net hydrogen production and to maintain pressure control. Typically another portion of this withdrawn gas stream is recycled via compressing means to the reforming zone in the conventional manner. Similarly, the heavy hydrocarbon-rich liquid phase from the separating zone is withdrawn and typically passed to a suitable fractionation system wherein a refractory light hydrocarbon-rich gas stream containing $C_1$ to $C_4$ alkanes is taken overhead and a $C_5+$ product reformate recovered as bottoms. The refractory light hydrocarbon-rich stream can then, of course, be recycled to the reforming zone in order to supply at least a portion of the hydrocarbon additive.

It is within the scope of the present invention to operate with once-through hydrogen and refractory light hydrocarbon streams, but the preferred procedure is to recycle hydrogen and refractory light hydrocarbon streams recovered from the effluent stream as indicated above.

A singular advantage of the improved process of the present invention is the capability to operate in a stable fashion at low pressure. In the past, it has been the practice to operate at high pressure primarily to provide sufficient hydrogen to saturate hydrocarbon fragments generated during the reforming process and to prevent excessive carbon deposition on the catalyst with the attendant decline in the catalyst's activity for the upgrading reactions of interest. I have now found that a highly stable operation is achieved using the process of the present invention at pressures in the range of about 25 to about 350 psig. and preferably about 75 to about 250 psig. The exact selection of the operating pressure within these ranges is made primarily as a function of the characteristics of the particular charge stock and catalyst used in the process.

The temperature required in the reforming zone is generally lower than that required for a similar high pressure operation. This significant and desirable feature of the present invention is a consequence of the inherent selectivity of the low pressure operation for the octane-upgrading reactions as previously explained. In the past, when high octane was required, it was the practice to run at higher temperatures in order to produce more hydrocracking of paraffins and thus concentrate the available aromatics in the product stream; however, this high cracking is not needed to make octane in the process of the present invention. Accordingly, the present process requires a temperature in the range of about 800° to about 1100° F, and preferably about 900° to about 1050° F. As well known to those skilled in the reforming art, the initial selection of the temperature within this broad range is made primarily as a function of the desired octane in the product reformate considering the characteristics of the charge stock and of the catalyst. Ordinarily, the temperature is increased during the run to compensate for deactivation that occurs and to provide a constant octane product.

The process is operated at a liquid hourly space velocity in the range of about 0.1 to about 10 hr.$^{-1}$, with a value of about 0.75 to about 5 hr.$^{-1}$ being preferred. Similarly, the hydrogen necessary for the present invention is supplied to the reforming zone at about 0.5 to about 10 moles per mole of hydrocarbon in the feed. Excellent results are obtained when about 1 to about 5 moles of hydrogen are used for each mole of hydrocarbon in the feedstock.

Another advantage of the improved process of the present invention is the infrequency with which the catalyst must be regenerated. Previously, low pressure operations have required extensive regenerating facilities if the associated catalyst is to be used for an economic period of time. The process of the present invention, since it operates for at least a catalyst life of 15 BPP and more typically, 25 BPP to 100 BPP, without any regeneration can be built without extensive regenerating facilities, such as swing bed reactors, thereby effecting great savings in initial investment. For example, for a typical reforming catalyst having an apparent bulk density of about 32 lb/cu. ft., the improved process of the present invention would operate, for a minimum catalyst life of at least 15 BPP, which at a typical LHSV of 1 hr.$^{-1}$ corresponds to 3.7 months before any regeneration of the catalyst would be required; and depending on the charge stock and severity level utilized, it would more typically operate for a catalyst life of about as BPP to about 100 BPP which at a LHSV of 1 hr.$^{-1}$ corresponds to a catalyst life of about 6.15 months to about 24.6 months without any regeneration of the catalyst. An additional incentive for avoiding frequent regeneration is the substantial danger of injecting small amounts of detrimental substances such as water into the system from the regeneration operation via inefficient purging techniques once the oxidation step of the regeneration cycle is completed. As previously discussed, thee presence of even small quantities of water in the system can under certain circumstances jeopardize the stability of the process.

The following examples are intended to be illustrative rather than restrictive.

EXAMPLE I

In order to study the response of a catalytic reforming process to refractory light hydrocarbon addition at low pressure, a series of high severity, low pressure catalytic reforming runs were made with methane as the refractory light hydrocarbon. Various amounts of methane were continuously added to a reforming zone containing a high performance, bimetallic reforming catalyst. The first run, run A, was a control run and was operated with no methane addition to the reforming zone. The second run, run B, was designed to demonstrate the significance of methane addition when the mole ratio of methane to hydrogen entering the reforming zone is maintained at a value of 0.51:1. The third run, run C, was designed to illustrate the fact that even relatively large amounts of methane are beneficial and it was run at a mole ratio of methane to hydrogen according to 3.2:1.

All of these runs were performed in the laboratory scale reforming pilot plant of conventional design comprising a reactor containing the reforming catalyst, a hydrogen-separating zone, a debutanizer column and conventional heating, pumping, compressing, and cooling means. The flow scheme utilized in all cases involves: heating a mixture of a gasoline fraction and a gas stream comprising hydrogen and in the case of runs B and C methane, to the desired conversion temperature. The resulting mixture was then passed downflow through a reactor containing a fixed bed of the reforming catalyst. An effluent stream was then withdrawn from the reactor, cooled to a temperature of minus 20° F. and passed into a separating zone wherein a hydrogen-and methane-rich gas phase separated from a liquid hydrocarbon phase. In all of these runs the plant was operated on a once-through basis without recycle; thus, the gas phase from the hydrogen-separating zone was withdrawn and analyzed to determine hydrogen production. Similarly, the hydrocarbon phase from the hydrogen separating zone was withdrawn therefrom and passed to the debutanizer column wherein the light ends (i.e. $C_1$ to $C_4$) were taken overhead in the conventional manner and a $C_5$+ product reformate stream was recovered as bottoms.

The same was used in each of the runs. The catalyst comprised an alumina carrier material containing, on an elemental basis, about 0.6 wt. % platinum, about 0.5 wt. % tin and about 1.09 wt. % combined chloride. The catalyst was prepared by dissolving substantially pure aluminum pellets in a hydrochloric acid solution to form an aluminum hydroxyl chloride sol. Thereafter, an amount of stannic chloride calculated to provide a final catalyst containing about 0.5 wt. % tin was dissolved in the sol. The resulting solution was then vigorously stirred in order to evenly distribute the tin moiety throughout the sol. A conventional gelling agent, hexamethylenetetramine, was then added to the resulting mixture to form a dropping solution which was subsequently gelled by dropping it in an oil bath selected to form spherical particles of an alumina hydrogel having an average diameter of approximately one-sixteenth inch. The resulting spherical hydrogel particles were aged and washed in an ammoniacal solution and thereafter dried and calcined to form a gamma-alumina carrier material containing about 0.5 wt. % tin in the form of tin oxide. Additional details as to the mechanics associated with this method of carrier material operation are given in the teaching of U.S. Pat. No. 2,620,314. The resulting catalyst support particles were then impregnated with an impregnation solution containing chloroplatinic acid and hydrogen chloride in amounts sufficient to yield a catalyst containing about 0.6 wt. % platinum on an elemental basis. The impregnated spheres were then dried at a temperature of about 300° F. for about 1 hour and calcined in an air atmosphere at a temperature of about 975° F. for about 1 hour. The resulting calcined spheres were then subjected to a halogen adjustment step by contacting them with an air stream containing $H_2O$ and HCl in the mole ratio of about 40:1 to about 80:1 for about 2 hours at about 975° F. After this halogen adjustment step the resulting material was then subjected to a dry prereduction step by contacting the particles with a substantially pure hydrogen stream containing less than 20 vol. ppm. water at a temperature of about 1025° F., a pressure slightly above atmospheric and a flow rate of hydrogen through the catalyst particles corresponding to a gas hourly space velocity of about 720 hr.$^{-1}$ for a period of about 1 hour. An analysis of the resulting catalyst showed it to contain, on an elemental basis, about 0.587 wt. % platinum, 0.46 wt. % tin and 1.09 wt. % chlorine.

In all cases the test run utilized was a high severity reforming operation which was designed to measure on an accelerated basis the activity, selectivity and stability characteristics of the catalyst under the conditions of the test. Each run consisted of a series of six periods of 24 hours each. Each of these periods comprised a 12 hour lineout period followed by a 12 hour test period during which the $C_5+$ product reformate was collected and analyzed. The common conditions employed in all runs were a liquid hourly space velocity of 1.5 hr.$^{-1}$, a hydrogen to hydrocarbon mole ratio of about 4:1 and an inlet reactor temperature which was continuously adjusted throughout the test in order to achieve and maintain a $C_5+$ target octane of 102 F-1 clear. The partial pressure of hydrogen in the reaction zone for all three test runs was maintained in the range of about 82 to 90 psi. Likewise, the hydrocarbon partial pressure was maintained relatively constant in the range of 18 to 20 psi. In the case of run A no methane was added and the total reactor pressure comprised the sum of the partial pressures of hydrogen and hydrocarbon or 101 psi. In the case of run B, 46 psi. of methane was continuously added to the reaction zone so that the methane to hydrogen mole ratio was about 0.5:1 and the total pressure was 156 psi. In the case of run C, 264 psi. of methane was continuously added to the reaction zone so that the mole ratio of methane to hydrogen entering same was about 3.2:1 and the total pressure was 364 psi. Since it was desired to maintain the hydrogen partial pressure substantially the same for the three test runs, one effect of methane addition in runs B and C was to raise substantially the reaction inlet pressure (i.e. to 156 psi. for run B to 364 psi. for run C). Thus, the principal variable in the three runs studied was the mole ratio of methane to hydrogen with all other conditions being held substantially the same so that the effect of methane addition would be manifest. A summary of these process variables for these runs is presented in Table I.

The same charge stock was utilized in all three runs. Its characteristics are given in Table II. It is to be noted that this charge stock contained approximately 5 wt. ppm. equivalent of water and in view of the fact that the reforming plant in all cases was run on a once-through basis, the total amount of water entering the reforming zone was relatively low. Likewise, the amount of sulfur contained in the charge stock was 0.1 wt. ppm. and this essentially constitutes a substantially sulfur-free condition.

TABLE II

ANALYSIS OF CHARGE STOCK

| | |
|---|---|
| Gravity, ° API at 60° F. | 60.3 |
| Distillation Profile | |
| IBP, ° F. | 162 |
| 5%, ° F. | 186 |
| 10%, ° F. | 200 |
| 30%, ° F. | 224 |
| 50%, ° F. | 252 |
| 70%, ° F. | 286 |
| 90%, ° F. | 322 |
| 95%, ° F. | 338 |
| EBP, ° F. | 364 |
| Chloride, wt. ppm. | <0.1 |
| Nitrogen, wt. ppm. | 0.1 |
| Sulfur, wt. ppm. | 0.1 |
| Water, wt. ppm. | 5 |
| Octane Number, F-1 Clear | 43.8 |
| Paraffins, vol. % | 67.1 |
| Naphthenes, vol. % | 21.8 |
| Aromatics, vol. % | 11.1 |

The results of the three separate test runs under the conditions stated are presented in Table III in the terms of reactor temperature necessary to achieve and maintain the target octane number of 102 F-1 clear for the various periods of the test and $C_5+$ reformate yield expressed as volume percent of the charge stock. It is to be noted that the dashes appearing in the Table III for periods 3 and 5 indicate that the pertinent analysis were not obtained for these periods. For all of these runs, these numbers were corrected to 100% recovery at a 102 F-1 clear octane number by computer analysis.

TABLE III

RESULTS OF METHANE ADDITION STUDY

| Period No. | 1 | 2 | 3 | 4 | 5 | 6 |
|---|---|---|---|---|---|---|
| Temp., °F. Run A | 966.5 | 978.0 | — | 990.5 | — | 1002.0 |
| Temp., °F. Run B | 972.0 | 979.5 | — | 992.5 | — | 1000.5 |
| Temp., °F. Run C | 975.0 | 982.5 | — | 991.0 | — | 1000.0 |
| $C_5+$, L.V.% Run A | 77.5 | 78.2 | — | 79.0 | — | 77.8 |
| $C_5+$, L.V.% Run B | 77.1 | 77.6 | — | 78.9 | — | 76.9 |
| $C_5+$, L.V.% Run C | 75.0 | 72.1 | — | 76.5 | — | 79.4 |

TABLE I

SUMMARY OF VARIABLES FOR RUNS

| | P, psi. | $PH_2$, psi. | PHC, psi. | $PCH_4$, psi. | $H_2$/HC | $CH_4/H_2$ |
|---|---|---|---|---|---|---|
| Run A | 101 | 82 | 19 | 0 | 4.3:1 | 0 |
| Run B | 156 | 90 | 20 | 46 | 4.4:1 | 0.51:1 |
| Run C | 364 | 82 | 18 | 264 | 4.4:1 | 3.2:1 |

With reference now to Table III it can be ascertained that the principal effect of methane addition on the catalytic reforming process was to produce a sharp improvement in the stability characteristic of the catalyst as is manifested in the rate of change of reactor temperature necessary to make octane during the six periods of the test. Specifically, the increment in reactor temperature necessary to maintain octane over the six period test observed for run A was 35.5° F.; for run B it was 28.5° F., and for run C it was 25° F. Selectivity characteristics are usually judged by reference to the $C_5+$ yield, and a perusal of the results presented in Table III indicate that the selectivity characteristics were comparable in all three cases. The first thing to be noted from these results is that methane addition is definately not detrimental to the performance of the catalyst. This in and of itself is quite surprising in view of the teachings in the prior art of the adverse effects of methane and the desirability of performing a reforming operation with substantially pure hydrogen. Even more surprising is my finding, which is manifest in the data for temperature stability, that not only is methane not detrimental to the performance of the catalytic reforming operation but in fact, if methane is used in the proper quantities, it can be quite beneficial. This point is clearly demonstrated by the fact that the increments in reactor temperature necessary to make octane in the case of runs B and C with methane addition were substantially less than in the case of run A, where no methane addition was made. Methane addition can then provide a valuable means for the stabilizing of a platinum group metal-containing reforming catalyst in a low hydrogen partial pressure type of reforming process.

EXAMPLE II

Ethane is substituted for methane in the tests described in Example I and similar beneficial results are observed.

EXAMPLE III

Propane is substituted for methane in the tests described in Example I and analogous beneficial results to those reported in Example I are obtained.

It is intended to cover by the following claims, all changes, variations and modifications of the above disclosure of the present invention which would be self-evident to a man of ordinary skill in the catalytic reforming art.

I claim as my invention:

1. In a process for reforming a hydrocarbon charge stock boiling in the gasoline range wherein the hydrocarbon charge stock and hydrogen are continuously contacted in a reforming zone with a reforming catalyst, containing a catalytically effective amount of a platinum group metal, at reforming conditions, including a pressure of about 25 to about 250 psig., selected to produce a high octane effluent stream, the improvement which comprises continuously adding a refractory light hydrocarbon selected from the group consisting of ethane and propane to the reforming zone in an amount sufficient to result in a mole ratio of refractory light hydrocarbon to hydrogen entering the reforming zone of about 0.4:1 to about 10:1, said refractory light hydrocarbon addition being commenced at start-up of the process and continuing throughout the duration of the reforming run.

2. An improved process as defined in claim 1 wherein the refractory light hydrocarbon is ethane.

3. An improved process as defined in claim 1 wherein the refractory light hydrocarbon is propane.

4. An improved process as defined in claim 1 wherein the reforming catalyst comprises a porous carrier material containing catalytically effective amounts of a platinum group metal and combined halogen.

5. An improved process as defined in claim 4 wherein the platinum group metal contained in the catalyst is platinum.

6. An improved process as defined in claim 4 wherein the halogen contained in the catalyst is combined chlorine.

7. An improved process as defined in claim 4 wherein the porous carrier material is a refractory inorganic oxide.

8. An improved process as defined in claim 7 wherein the refractory inorganic oxide is alumina.

9. An improved process as defined in claim 1 wherein the reforming conditions include a temperature of about 800° to about 1100° F., a liquid hourly space velocity of 0.1 to about 10 hr.$^{-1}$ and a mole ratio of hydrogen to hydrocarbon of about 0.5:1 to about 10:1.

10. An improved process as defined in claim 1 wherein the amount of refractory light hydrocarbon continuously added is sufficient to provide a mole ratio of refractory light hydrocarbon to hydrogen entering the reforming zone of about 0.5:1 to about 3.5:1.

11. An improved process as defined in claim 1 wherein the reforming catalyst also contains a metal selected from the group consisting of rhenium, iridium, tin, germanium and lead.

12. An improved process as defined in claim 1 wherein the amount of refractory hydrocarbon added to the zone is maintained constant throughout the duration of the reforming run.

13. An improved process as defined in claim 1 wherein the amount of refractory light hydrocarbon added to the zone is decreased during the course of the reforming operation responsive to deactivation of the catalyst.

* * * * *